(12) United States Patent
Strasser

(10) Patent No.: US 8,387,218 B2
(45) Date of Patent: Mar. 5, 2013

(54) SAFETY DEVICE

(76) Inventor: Philipp Strasser, Hinterbrühl (AT)

( * ) Notice: Subject to any disclaimer, the term of this patent is extended or adjusted under 35 U.S.C. 154(b) by 16 days.

(21) Appl. No.: 12/866,707

(22) PCT Filed: Feb. 5, 2009

(86) PCT No.: PCT/EP2009/051305
§ 371 (c)(1),
(2), (4) Date: Nov. 2, 2010

(87) PCT Pub. No.: WO2009/098249
PCT Pub. Date: Aug. 13, 2009

(65) Prior Publication Data
US 2011/0047764 A1     Mar. 3, 2011

(30) Foreign Application Priority Data
Feb. 6, 2008   (AT) .................................. A 191/2008

(51) Int. Cl.
*F16B 45/02* (2006.01)
(52) U.S. Cl. ...................... 24/599.5; 24/599.9; 24/600.1; 24/600.2; 24/600.8; 24/601.1; 182/3; 182/5
(58) Field of Classification Search ................. 24/599.5, 24/599.9, 600.1, 600.2, 600.8, 601.1; 182/3, 182/5
See application file for complete search history.

(56) References Cited

U.S. PATENT DOCUMENTS

| | | | |
|---|---|---|---|
| 2,116,880 A | 5/1938 | Dee | |
| 2,591,487 A * | 4/1952 | Wirz | 280/504 |
| 3,179,994 A * | 4/1965 | Meyer et al. | 24/134 R |
| 3,493,260 A * | 2/1970 | Smith | 294/82.33 |
| 3,698,048 A * | 10/1972 | Weman | 24/599.7 |
| 3,852,943 A * | 12/1974 | Healy | 24/134 R |
| 4,093,293 A * | 6/1978 | Huggett | 294/82.33 |
| 4,423,796 A * | 1/1984 | Sulowski et al. | 182/8 |
| 4,528,728 A * | 7/1985 | Schmidt et al. | 24/599.4 |
| 5,940,943 A * | 8/1999 | Kloster | 24/588.1 |
| 7,093,330 B2 * | 8/2006 | Ferguson et al. | 24/599.6 |
| 2004/0016597 A1 * | 1/2004 | Gregory | 182/5 |

FOREIGN PATENT DOCUMENTS

| | | |
|---|---|---|
| AT | 504458 A1 | 5/2008 |
| DE | 7919515 U1 | 4/1979 |
| DE | 102005009946 B3 | 6/2006 |
| DE | 102006010898 A1 | 9/2007 |
| FR | 2483781 A1 | 11/1981 |
| WO | WO2004113745 A1 | 12/2004 |
| WO | WO2008049143 A | 5/2008 |

* cited by examiner

*Primary Examiner* — Robert J Sandy
*Assistant Examiner* — David Upchurch
(74) *Attorney, Agent, or Firm* — Robert A. Blaha; Smith Risley Tempel Santos LLC (57) ABSTRACT

A belaying system includes a fastening component suspended on a securing means. The fastening component secures a load connected to the fastening component. The fastening component includes a bar. The fastening component and the bar hold the securing means. When unlocked, the bar rotates to enable the fastening component to be removed from the securing means. When locked, the bar cannot rotate and the fastening component cannot be removed from the securing means. The bar is unlocked with an unlocking element. The bar is locked with a locking element. The unlocking element and the locking element are fastened directly or indirectly by and/or on the securing means separately from one another. When the unlocking element is fastened to the fastening component the bar is unlocked and the fastening component remains suspended from the unlocking element. When the locking element is fastened to the fastening component the unlocking element is unfastened.

8 Claims, 11 Drawing Sheets

SAFETY DEVICE

BACKGROUND

The invention relates to a belaying device with a fastening component, mountable on a securing means that is connectable to a person to be belayed by means of a connecting element.

A safety device of this type can replace a via ferrata set. Via ferrata sets ensure the safety of climbers on so-called "secured" via ferrata or high rope courses. They are also used, however, for exposed work on house fronts, roofs, bridges, masts, etc., as well as in shipping, particularly on sailing boats. Furthermore, the invention can also be used to secure objects, for example against shoplifting, in space travel or for secure prisoner transfer. For better visualisation, subsequently it is referred to personal protection against falling. Here, securing yachtsmen, for whom the main danger is not falling but drifting off in the water, and objects, for which wrongful dislodgment should be avoided, and other application methods are supposed to be meant analogously.

As a rule, a belaying set comprises two carabiners, each of which is attached to the person securing himself via a connecting piece formed by a rope or a belt, e.g. on a safety belt, such as a waist belt. Rollers (single or multiple roller) are also used in the belaying set instead of a snap hook or rollers with a snap hook clasp, particularly in high rope courses. Belaying sets in rope courses, as a rule, consist of two or three fastening components, the connecting pieces to the person secured can be of various lengths. The fastening components are frequently attached to the free ends of a Y- or V-shaped rope or strap, which is furnished with a rope or strap or another suitable connecting piece centrally with an attachment device for attachment onto a safety belt of the person securing himself. Frequently, one or more damper are also incorporated into these connections, in order to defuse the fall of a person into the safety device. As a rule, the safety device is attached at the front or at the back of the safety belt.

When climbing, the climber should always be hooked by at least one fastening component onto a safety device (e.g. steel cable, another rope, rungs, safety ring, frame, single or double roller insolvably attached to the cable, or a safety ring), pre-installed onto the via ferrata or onto the high rope course. The second fastening component is either likewise hooked on, or it has been opened in order to re-attach it during changes in direction or gaps in the pre-installed safety device, i.e. it can be hooked into the continuation of the pre-installed safety device.

The following problems arise here:

In using via ferrata sets, accidents occur time after time that are the result of human error on the part of the user or of other participants. Particularly for children and inexperienced users, not least due to the nervousness caused by the altitude of high rope courses and vie ferrate, improper handling occur over and over, such as unhooking both fastener components at once. It also occurs time and again that participants inadvertently unhook all fastener components of each other or that participants are not aware of the risk and deliberately unhook both (or all) fastener components at the same time. This means that they are not secured, which, in the worst case, may result in the user's falling from a great height.

In accordance with the state of the art, single carabiners, lockable against accidental opening, are well-known, including from WO 2004/113745 A1, from which an embodiment is known, in which a carabiner comprises a blocking mechanism that can be moved into the release position for remote unlocking using a lanyard. In accordance with U.S. Pat. No. 2,116,880 A, a carabiner latch can be unlocked using a key rod. FR 2 483 781 A1 describes a snap hook, which is additionally opened by spring force. Furthermore, DE 79 19 515 U1 publishes a safety hook with remote opening which can be activated via a Bowden cable. U.S. Pat. No. 4,528,728 A describes various blocking mechanisms for individual snap hooks. DE 10 2005 009 946 B3 describes a via ferrata set which emits an alarm signal if both snap hooks are removed from the safety cable at the same time. U.S. Pat. No. 4,423,796 describes a belaying device where both carabiners are connected by a Bowden cable, wherein only one of the securing means can be detached at a time. DE 10 2006 010 898 describes the same process, wherein the fastening component identifies a safety cable as safe by its diameter. Two fastening components that communicate with one another are likewise described in the unpublished AT 1771/2006, wherein a secure attachment point is identified each time by an identification component to be permanently mountable. This facilitates rapid modification of high rope courses or vie ferrate and, furthermore, an impact on the direction of use, the use of rungs, safety rings, and a safety of vertical ascents and descents.

SUMMARY

The aim of the invention is to avoid these risks and it addresses the task of creating a safety device as described at the beginning, using which, it is possible to prevent unhooking from the securing means, such that the risk of falling is reliably avoided, even when persons being absolutely untrained in climbing or securing, such as children or those with particular initial difficulties (e.g. mental handicap), use the safety device. The belaying device should be particularly easy to handle, but easy to manufacture nevertheless and it should provide a maximum of safety with a minimum of component parts.

The underlying purpose of the invention is achieved by a combination of the following features:
the fastening component has a recess, lockable by means of a bar, for the accommodation of the securing element;
the bar is unlockable by means of an unlocking component while releasing the recess and lockable by means of a locking component while closing the recess,
wherein the unlocking component and the locking component are directly or indirectly attached, separately from one another, next to and/or onto the securing means; and
the unlocking component is movable to the fastening component mounted on the securing means and, while the recess is released, attachable to this, and the fastening component is movable to the locking component only when the fastening component is mounted on the securing means,
wherein the attaching of the unlocking component on the fastening component can be unfastened with the locking procedure.

Only one single fastening component per person is necessary in the preferred embodiment of the invention. In its normal state, due to a blocking device, the fastening component cannot be removed, without being damaged, from the securing means (steel cable, another rope, chain, rung, safety ring, roller attached to a cable, etc.). The use of second or additional fastening components is likewise conceivable. These can be designed in accordance with the invention or conventionally, as well.

The fastening component can only be removed from the securing means by attaching an unlocking device. The unlocking device is attached to a secure point (e.g. a mast or tree in the rope course, a bolt in the rock on the via ferrata) by means of a connecting piece (e.g. a chain, cable or cord) and, after attachment to the fastening component, can no longer be detached from the same without being damaged. Hence, the unlocking key, due to its being attached to the fastening component, assumes the safety function.

A locking component is pre-installed at the next secure point of attachment (steel safety cable, safety ring, chain, etc.). The locking component is designed such that the fastening component can only be activated after it has been attached to the secure point of attachment. The fastening component is locked and the unlocking mechanism released again by activation by means of the locking means, such that the person can move further along the securing device with the fastening component.

A key attached to the belay point can serve as a locking means. The deployment of electrical, electronic, magnetic or inductive acting securing means is, however, also possible. Furthermore, the use of optical acting securing means is conceivable.

Preferably, the safety device is characterised by that the unlocking component which is bringable to the fastening component is directly or indirectly attached to the securing means via a flexible connecting piece that is able to withstand a predetermined load, preferably a heavier load than the person to be belayed.

Two or more fastening components are provided for particular applications, whereby each fastening component each comprises a recess for receiving the securing means, closeable by means of a bar, and each bar can be unlocked by means of an unlocking component and locked by means of a locking component.

If two or more securing means are provided, the securing means are each equipped with at least one unlocking component and with at least one locking component.

In accordance with a preferred embodiment, the fastening component, when attached to the unlocking component, can be brought to a further unlocking component and this further unlocking component can be attached to the fastening component while releasing the first unlocking component.

BRIEF DESCRIPTION OF THE FIGURES

In the following, the invention is illustrated in more detail by a number of examples, in which FIG. 1a to FIG. 1h illustrate the underlying principle of the invention in more detail;

FIG. 3 to FIG. 6, by way of example, show a fastening component in the form of a snap hook and its individual parts;

FIG. 7a to FIG. 7c show possible forms of the locking key and the corresponding connecting piece;

FIG. 8a to FIG. 8c show the locking component in the form of a mechanical key attached to a steel cable;

FIG. 9a to FIG. 9h show the mechanical process during unlocking, transfer and locking of a fastening component in the form of a snap hook; and in FIG. 10a to FIG. 18h, further variants are illustrated.

DETAILED DESCRIPTION

The following description, which refers to FIG. 1a to FIG. 1h and FIG. 9a to FIG. 9h, is a detailed explanation of the handling of a belaying device in accordance with the invention. In FIG. 1a to FIG. 1h, a platform 1 of a high rope course is shown, wherein a securing means 2, such as a steel cable 2, is suspended between a mast 3 and another mast 3. The steel cable 2 is attached to each mast 3, for example, by wrapping, by an eyebolt fixed into the mast 3 or by a perforation (drilled hole) 4 through the mast and serves as a belay point to secure a person P against falling. The unlocking component 26, also subsequently called the unlocking key, is fastened to a secure point, e.g. the mast 3 in the high rope course, the steel cable 2 or an eyebolt 28 on the via ferrata, by a connecting piece 7. The connecting piece 7 may take the form of e.g. a steel cable, another rope, a chain, a strap, also the integration of a fall-damping component into the connecting piece 7 is conceivable. A locking component 5, also subsequently called a locking key 5, is stationary connected to the securing means, shown here as an outgoing steel cable 2'. Likewise, safety rings, rungs, staples (U-bolts for driving in), eyebolts or single or multiple rollers which cannot be demounted from the cable can be used as securing means.

Figure 1A:
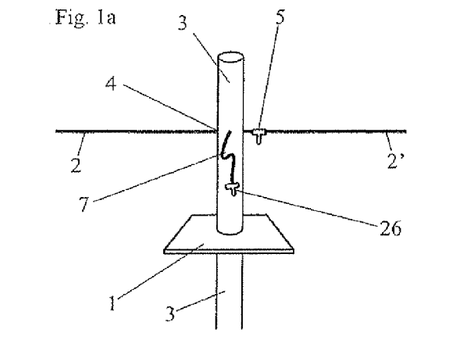
Figure 1B:
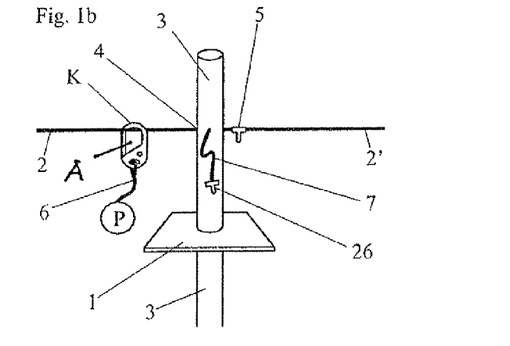
Figure 9A:
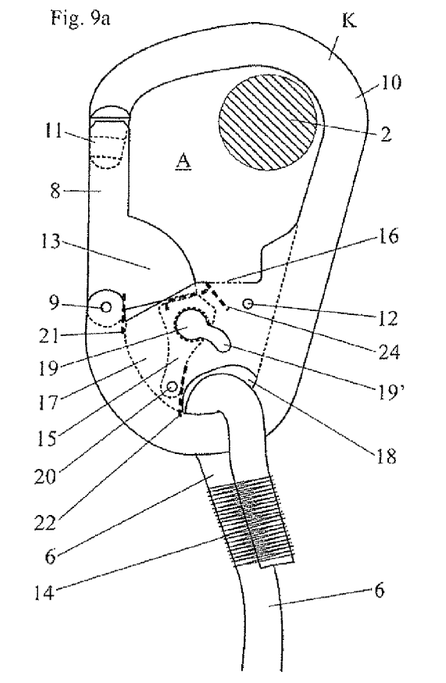

A participant P is shown in FIG. 1b, who is secured against a fall by a connecting component 6 with the fastening component K—such as a carabiner, hooked onto the steel cable 2. In this situation, the fastening component K is prevented from opening, that is the release of its lockable recess A, by the bar 8, subsequently called gate 8, by means of a blocking mechanism 15. FIG. 9a shows a detailed view of one preferred embodiment of this blocking mechanism 15. This blocking mechanism 15 is held in position by a leaf spring 22 which prevents the opening of the gate 8 of the fastening component K by its cantilever 13.

Figure 1C:
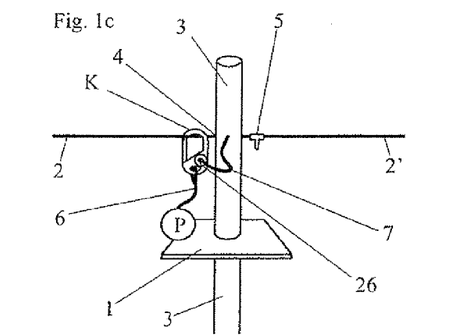
Figure 9B:
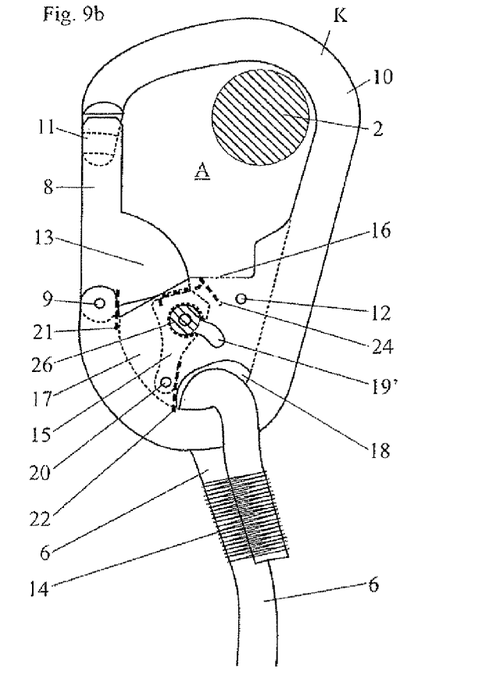
Figure 9C:
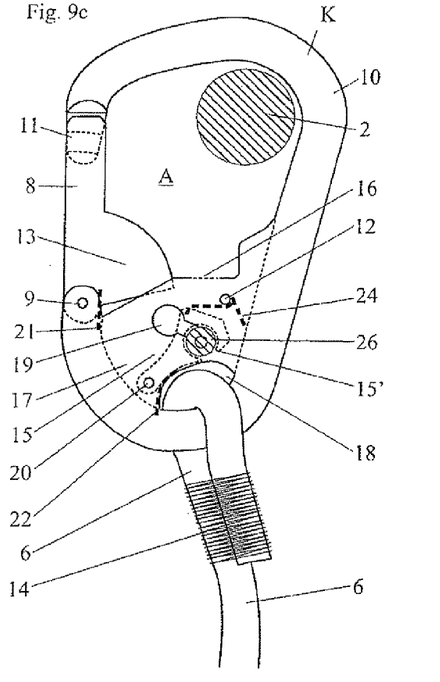

In FIG. 1c and FIG. 9b, the unlocking key 26 is inserted into the aperture 19 provided for it in the fastening component K. FIG. 9c shows how the blocking mechanism 15 is moved into the position by means of the unlocking key 26 that allows the gate 13 to be opened. The leaf spring 24 registers at the point 12, preferably a riveted or bolted metal pin, and thus prevents that the blocking mechanism 15 can be brought into the previous position. The unlocking key 26 can now no longer be removed from the aperture 19, since the aperture has a narrower diameter at this point 19'. It is likewise conceivable that the unlocking key 26 registers like a bicycle lock and need not be moved laterally.

Figure 1D:
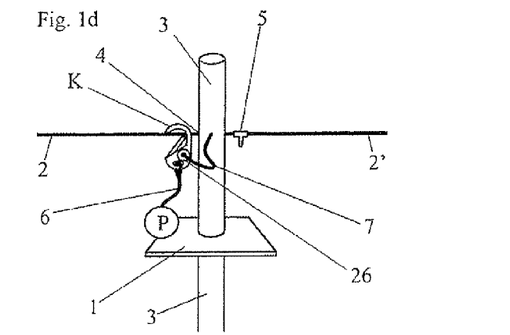
Figure 9D:
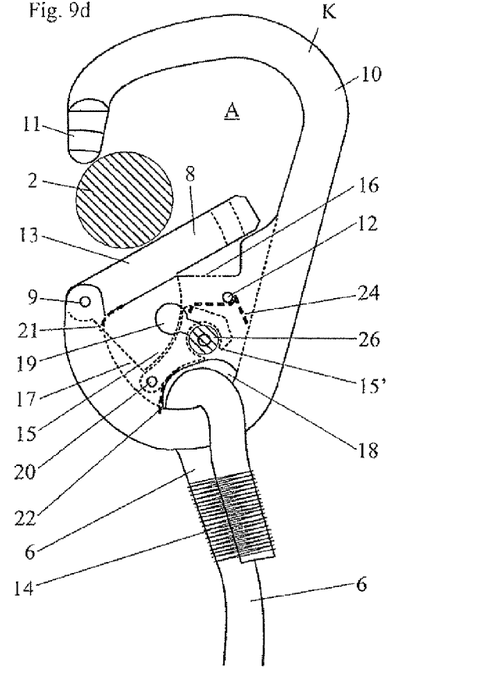
Figure 9E:
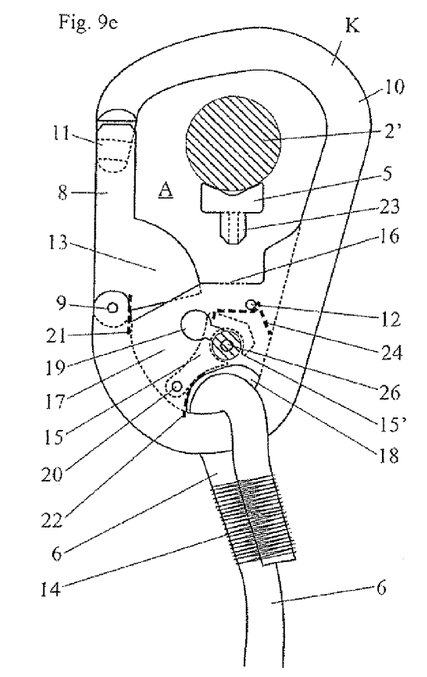

In FIG. 1d and FIG. 9d, the fastening component K is being removed from the steel cable 2, as it is now possible to open the gate 8. At this point, the participant P is secured from falling by the unlocking key 26, firmly connected to the fastening component K.

Figure 1E:
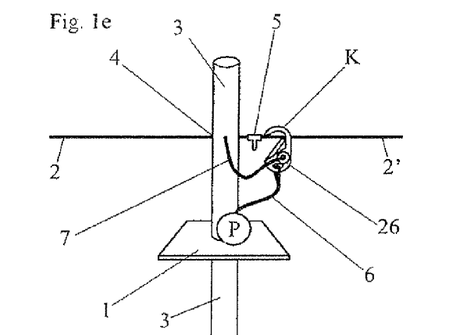

In FIG. 1e, the fastening component K is hooked to the next securing means, shown here as steel cable 2'. The connecting piece 7 must be of such a length that the fastening component K can be connected both to the incoming securing means 2 and to the outgoing securing means 2'. Furthermore, the length of the connecting piece 7 must guarantee that the locking key 5 can be reached by the fastening component K. A locking key 5 must be fixedly pre-installed on the securing means 2, 2' (steel cable, ring, rung etc.) at all access points.

Figure 1F:
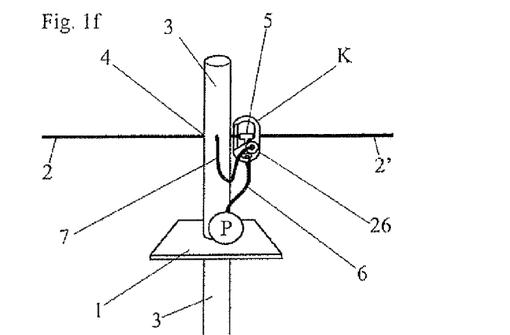
Figure 1G:
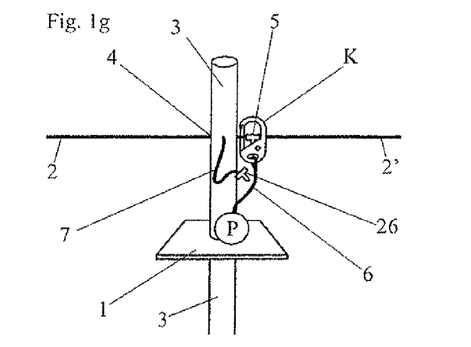
Figure 1H:
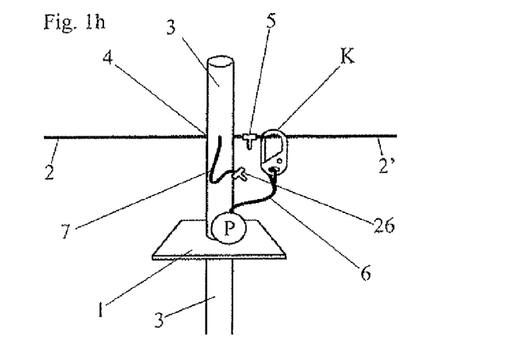
Figure 9F:
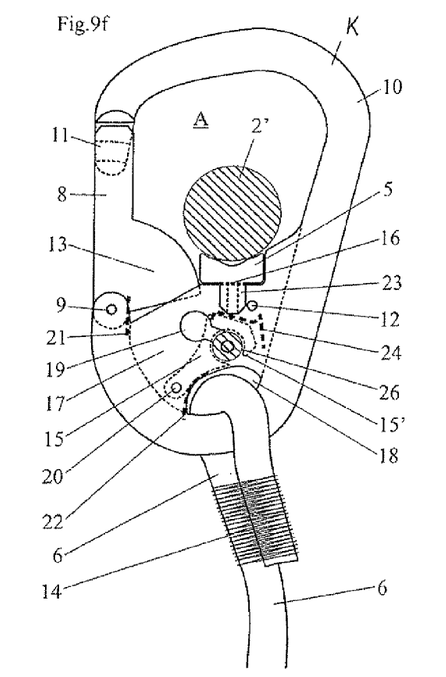
Figure 9G:
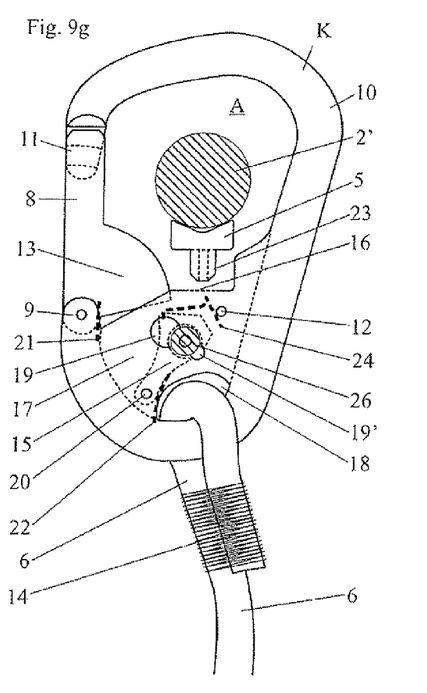
Figure 9H:
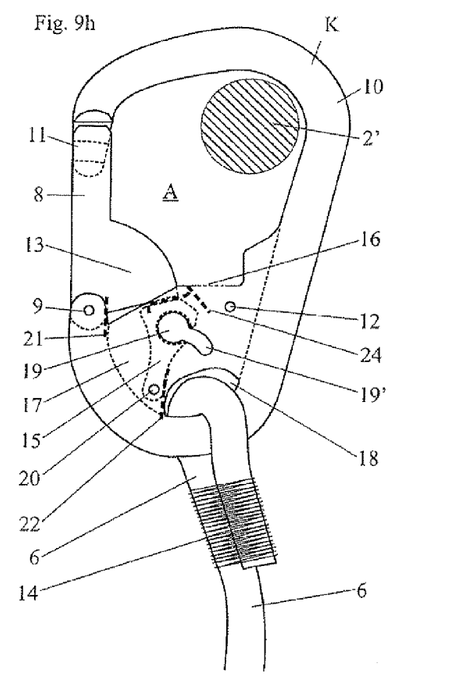

FIG. 1f and FIG. 9f show the insertion of the key-like form 23 of the locking key 5 into the aperture 16 provided for it in the fastening component K. Thus, the leaf spring 24 is disengaged from its blocked position and, as shown in FIG. 9g, releases the blocking mechanism 15 again. In FIG. 9h, the blocking mechanism 15 is returned to the position into which it is pushed by the leaf spring 22. In this position, on the one hand, the gate 8 is secured against opening by its cantilever 13, while, on the other hand, the unlocking key 26 is released.

The participant P is now secured against a fall by the locked fastening component K on the outgoing steel cable 2' and can continue on to the next stage (e.g. an exercise in the high rope course or a rope section to the next changeover point on the via ferrata).

Figure 2A:
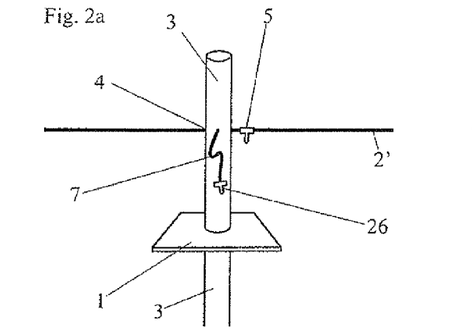
FIG. 2a to FIG. 2p show the principle of the invention with two fastening components.
Figure 2B:
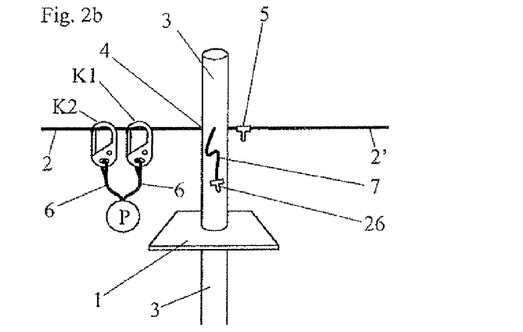
Figure 2C:
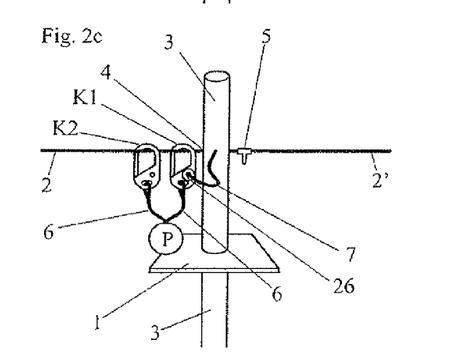
Figure 2D:
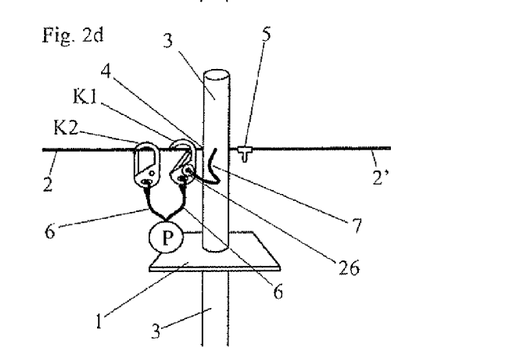
Figure 2E:
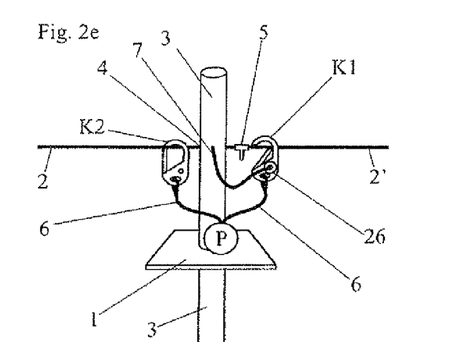
Figure 2F:
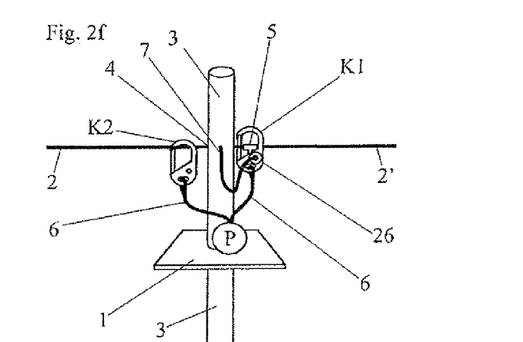
Figure 2G:
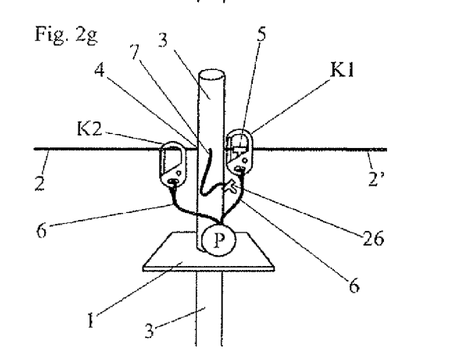
Figure 2H:
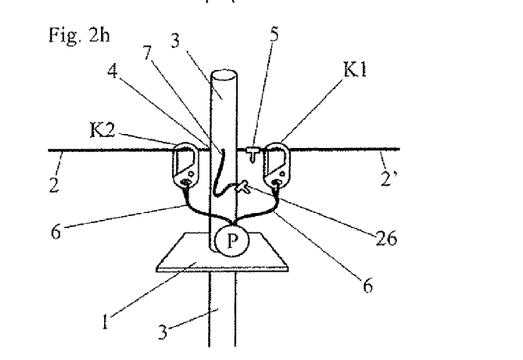
Figure 2I:
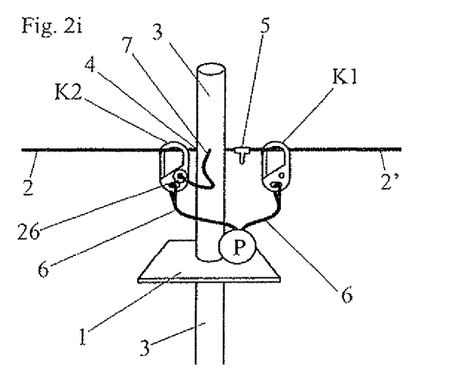
Figure 2K:
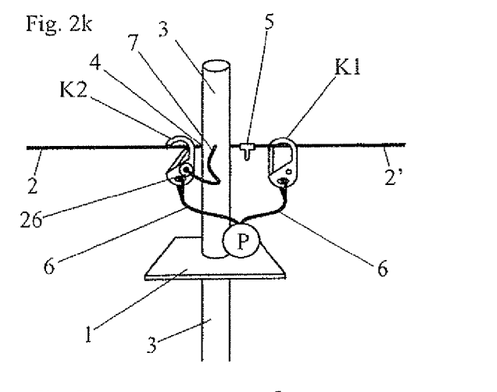
Figure 2L:
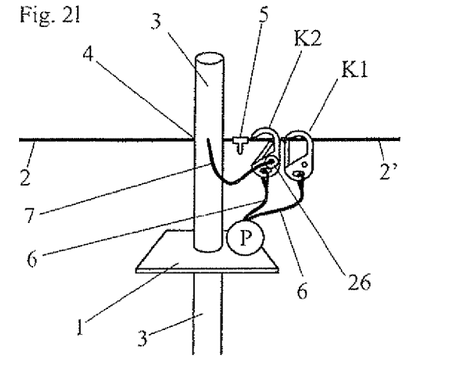
Figure 2M:
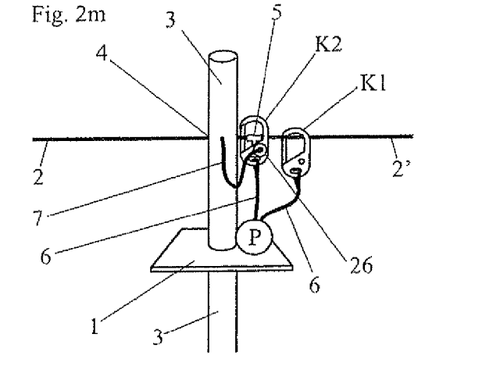
Figure 2N:
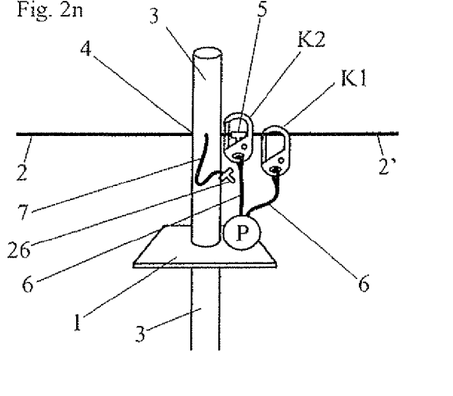
Figure 2P:
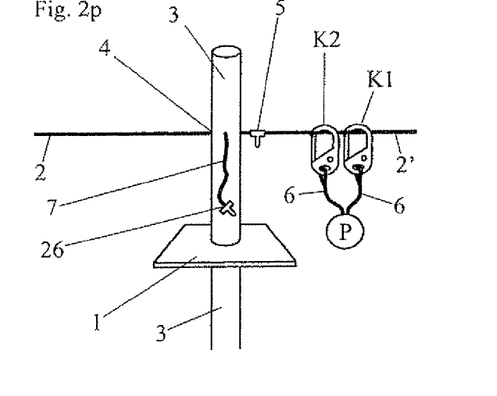

FIG. 2a to FIG. 2p illustrate the transfer procedure at a platform 2 in the high rope course with two fastening components K1 and K2. By using two fastening components K1 and K2, the person to be belayed P is always secured against a fall by at least one fastening component K1 and/or K2 on the safety cable 2 and/or 2'. In this embodiment, the unlocking component 26 and the associated connecting piece 7 have no personal belaying function and can be of a less sturdy design. In this case, however, it must always be ensured that only one unlocking mechanism 26 at the most is within reach of one of the two fastening components K1 and K2, so that fastening components K1 and K2 cannot be unlocked both at the same time. This must be guaranteed by the length of the connecting piece 7.

If the unlocking component 26, the connecting piece 7 and the point 19' of the fastening component K1 and K2 are sufficiently dimensioned and reach the prescribed minimum breaking load for personal safety, then the safety system in accordance with the invention will guarantee not only continual but also redundant security.

Figure 3:
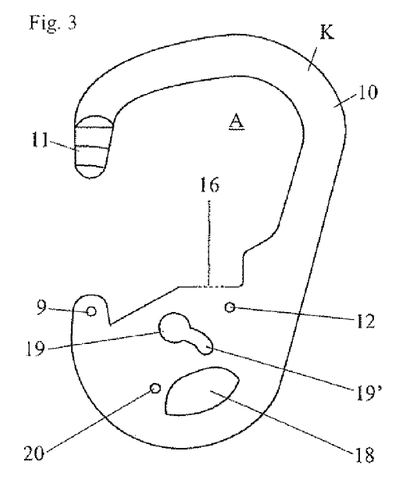

FIG. 3 shows the body 10 of the fastening component K in the embodiment of a snap hook. A single or multiple roller version is likewise conceivable. A steel pin 9, preferably riveted, forms the shaft of the gate 8. When closed, the gate 8 snaps into a recess 11, which is aligned at a tangent to the rotation centre 9 of the gate 8. 16 shows a lateral view of the insertion aperture for the locking key 5. Furthermore, the steel pin 12 (preferably riveted or in the form of a screw), for engaging the leaf spring 24 of the blocking mechanism 15, the steel pin 20 (preferably riveted or in the form of a screw), which forms the rotation centre of the blocking mechanism 15, and a hole 18 in the fastening component K, through which the end of the connecting link 6 is passed, are also shown. The insertion aperture 19 for the unlocking key 26 comprises a recess 19' with a narrow diameter, which ensures that the unlocking key 26 can no longer be released, after unlocking the fastening component K, without being damaged.

Figure 4:
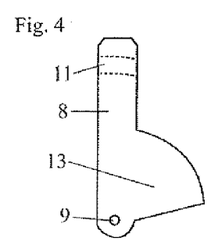

FIG. 4 shows the gate 8 of the fastening component. The pin 9, preferably in the form of a riveted steel pin or a screw, forms the rotation centre of the gate 8. When closed, the gate 8 engages into the body 10 of the fastening component K by means of a recess 11. The cantilever 13 of the gate 8 enables the gate 8 to be locked by the blocking mechanism 15.

Figure 5:
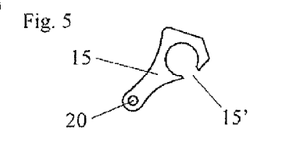

FIG. 5 shows the blocking mechanism 15. A metal pin 20, preferably in the form of a riveted steel pin or a screw, forms the rotation centre of the blocking mechanism 15. A recess 15' enables the unlocking key 26 to be inserted properly. The aperture 15' in the recess has the function of preventing the blocking mechanism 15 from being removed from the locking position using another object, such as a pin, or at least of making this exceedingly difficult.

Figure 6:
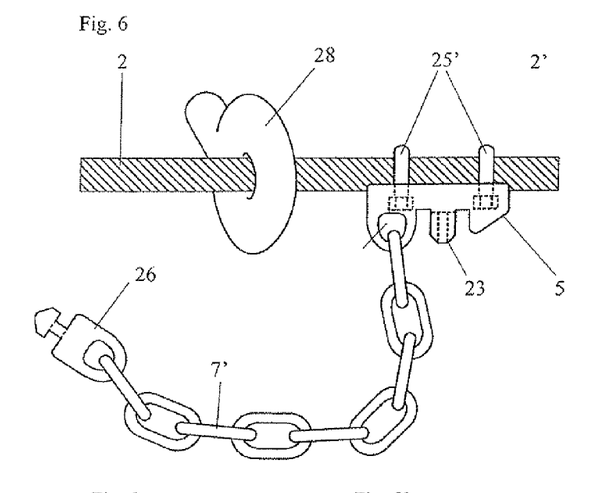

FIG. 6 shows a possible design variation in the form of a combination of the unlocking key 26 and a key-like element 23 of a locking key 5, to bridge a safety cable mounting in the form of an eyebolt 28, as is frequently found in vie ferrate. The combination of the two keys 5 and 26 into one assembly, which can be mounted on the safety cable 2', e.g. by means of the cable clamps 25', is particularly sensible, since it can be installed more quickly and thus the risk of losing individual parts during installation can be minimised. This variation is also particularly suitable for temporary installation in vie ferrate. It is conceivable that initially a trained person (e.g. a mountain guide) will lead the way and that he will install the transfer point in accordance with the invention, such that, subsequently, a number of persons (e.g. children in a school group) which are untrained with respect to safety will be safeguarded one after another and will negotiate the changeover in constant safety. Afterwards, another mountain guide will dismantle the transfer point in accordance with the invention again.

Figure 7:
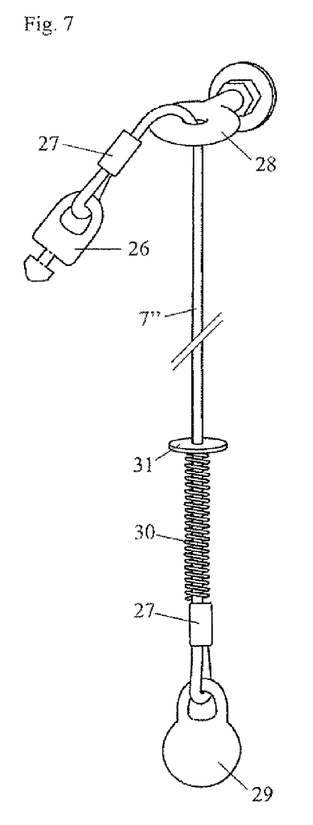

FIG. 7 shows the connecting piece 7 with the unlocking key 26. This version guarantees that the unlocking key 26 will always return to an easily locatable position where the person P is able to take hold of the same with ease. This is facilitated by the connecting piece 7 having been designed as a flexible cord 7", which is fed through an eyebolt 28. For this purpose, the eyebolt 28 must be permanently mounted on a secure point on the high rope course, such as a mast 3. The unlocking key 26 is permanently attached to one end of the cord 7", shown here using a crimp 27, a weight 29 is permanently attached at the other end of the cord 7", likewise shown here using a crimp 27, to keep the unlocking component 26 insolvably at a comfortable manipulation height, wherein the weight 29 must be heavier than the unlocking key 26. A coil spring 30 can be placed around the cord 7", between the weight 29 and eyebolt 28 in order to preserve the components against vigorous handling of the unlocking key. Both the unlocking key 26 and the weight 29 and, where used, the coil spring 30 must be designed such that they cannot be dragged through the hole of the eyebolt 28. If necessary, a flat washer 31 can be inserted.

Figure 8A:
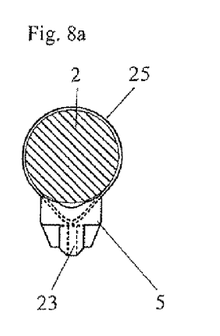
Figure 8B:
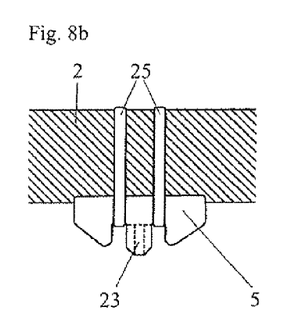

FIG. 8a and FIG. 8b show the locking key 5 with its key-like form 23 for insertion into the aperture 16 provided for the same in the fastening component K. The locking key 5 is permanently mounted on a securing means. The diameter of the securing means in accordance with the invention is variable and is only limited by the aperture of the fastening component K and the gate 8. Mounting onto other securing means, such as chains, poles, rungs, safety rings, single or multiple rollers permanently attached to a cable, are conceivable. The locking key 5 in FIG. 8a to FIG. 8c is attached to the cable 2 by means of two cable ties 25. Fastening by means of cable clamps (so-called U-bolts) is likewise conceivable. If the locking procedure is not mechanical, but is provided by means of identification by a computer chip or by optical scanning, the locking key can also be attached merely by means of adhesive tape (so-called tape).

FIG. 10a to FIG. 10m show another variant of the belaying device in accordance with the invention, where a change directly from one unlocking key 26 to another unlocking key 26' can be made or the fastening component K can be attached to a secure point (e.g. steel cable, safety ring, rung, single or multiple roller firmly attached to the steel cable) by means of the unlocking key 26. The fastening component K comprises an insertion aperture 16, into which both the unlocking key 26 and the locking keys 5 can be inserted.

Figure 10A:
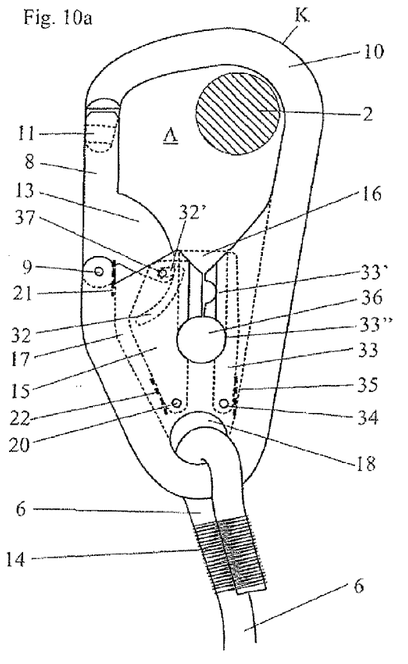

FIG. 10a shows a fastening component K hooked and locked onto a steel cable 2. The blocking mechanism 15 locks the free movement of the steel pin 37 (preferably, a riveted steel pin). Thereby, the gate 8 cannot be opened by the blocked cantilever 13.

Figure 10B:
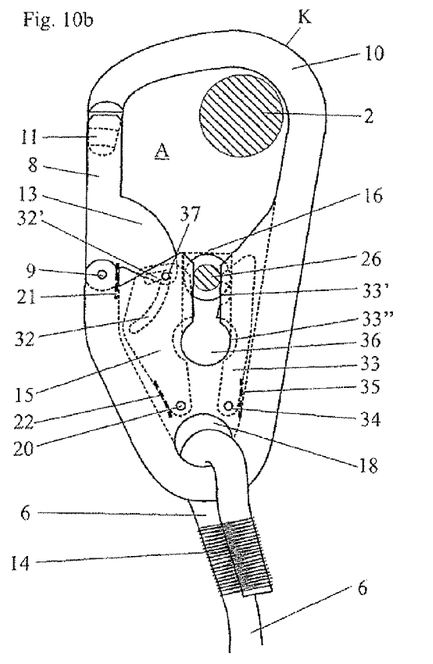

In FIG. 10b, an unlocking key 26 is inserted into the insertion aperture 16.

Figure 10C:
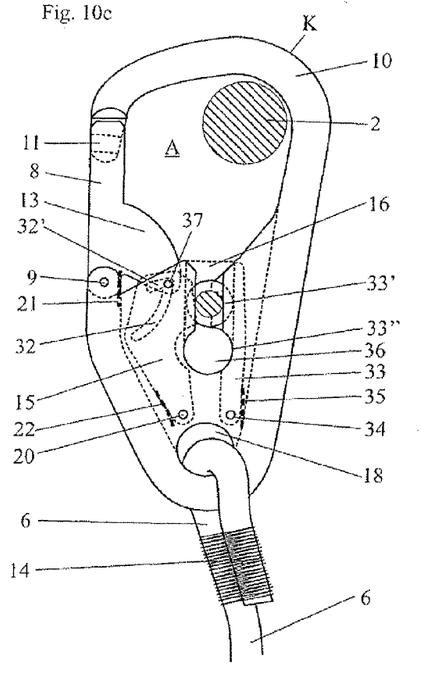

In FIG. 10c, the unlocking key 26 blocks in the projection 33' of the locking lever 33. This is always pushed into this position by the leaf spring 34 in order to enable this blocking, if necessary. The unlocking key 26 can now no longer be removed from the fastening component K without being damaged. The person P is now secured via the unlocking key 26. The blocking mechanism 15 is forced into this position by the unlocking key 26, locked in this position, which allows the steel pin 37 on the projection 13 of the gate 8 to move.

The unlocking key 26 can now be removed in two alternative ways: FIG. 10e to FIG. 10h show the removal of the unlocking key 26 by inserting another unlocking key 26'; FIG. 10g to FIG. 10m demonstrate the removal of the unlocking key 26 by inserting a locking key 5.

Figure 10D:
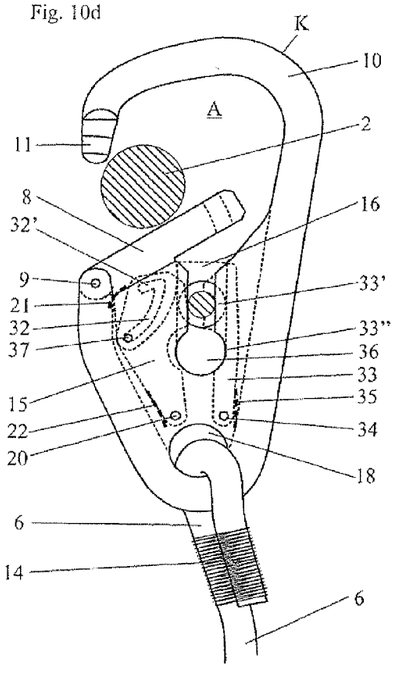

FIG. 10d shows the opening of the gate 8 enabled in this fashion and the potential removal of the steel cable 2.

Figure 10E:
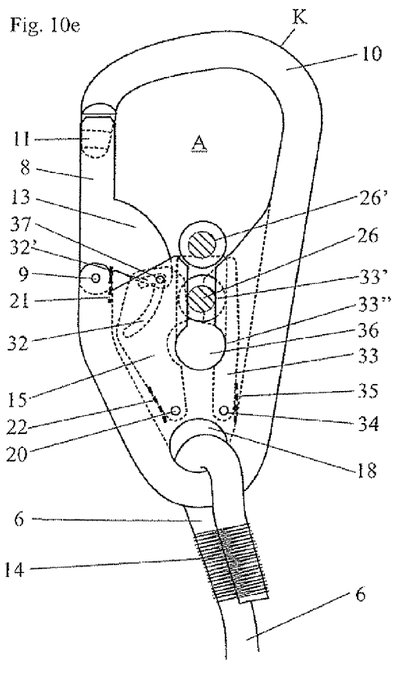

In FIG. 10e, a new unlocking key 26' is inserted into the insertion aperture 16.

Figure 10F:
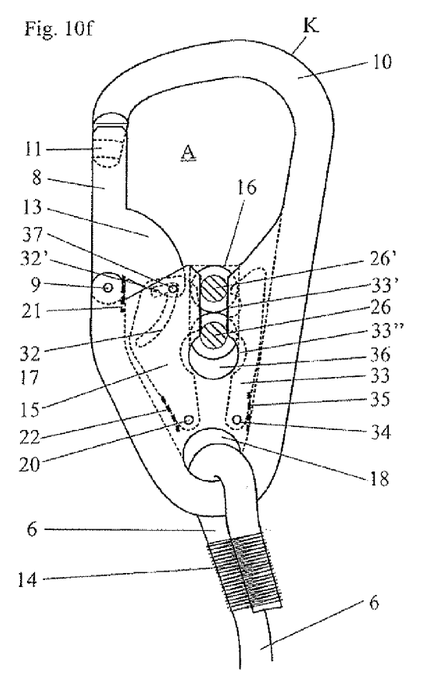

FIG. 10f shows how the original unlocking key 26 is released from its blockade by inserting the new unlocking key 26'.

Figure 10G:
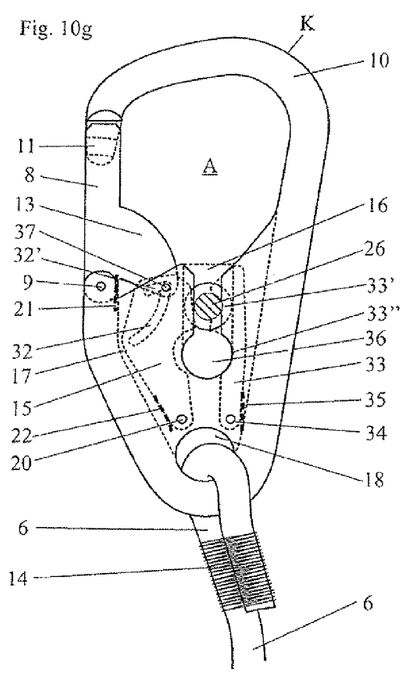
Figure 10H:
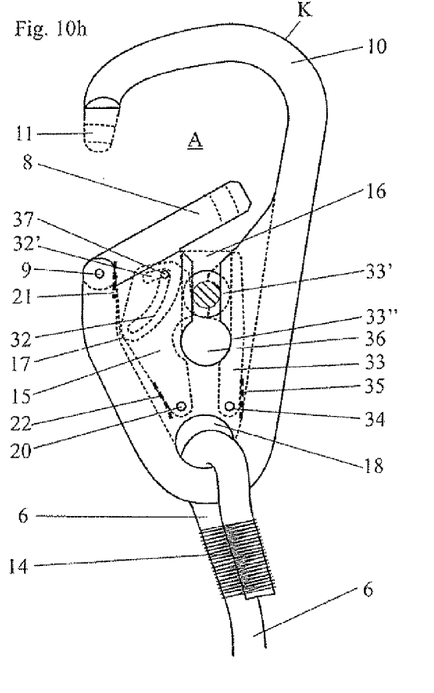

In FIG. 10g, the original unlocking key 26 has already been removed and the new unlocking key 26' is permanently attached to the fastening component K by the locking lever 33.

In FIG. 10e to FIG. 10h, the gate 8 can be opened, since the safeguarding of the person P has been solely assumed by the unlocking keys 26 and 26'. In accordance with the invention, the unlocking keys 26 and 26' are each attached to a secure point, for example a mast 3 in the high rope course, by a connecting piece 7.

Figure 10I:
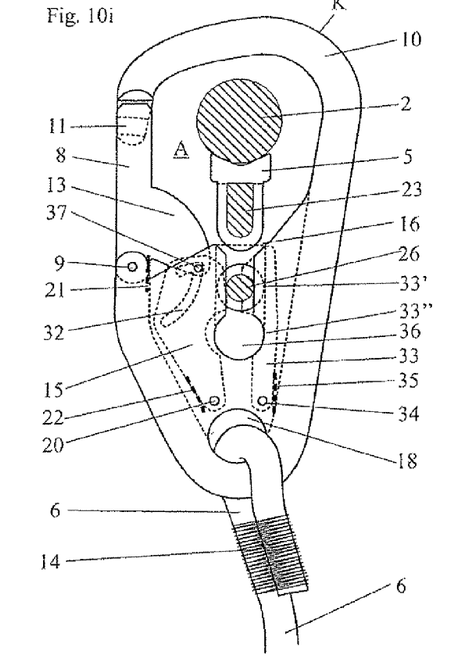

In FIG. 10i, the fastening component K has been attached to a secure steel cable 2. A secure steel cable 2 or another secure point, such as a safety ring, another rope, a chain, a rung, an eyebolt, a staple or a single or multiple roller firmly attached to a cable, is characterised in accordance with the invention by a locking key 5 being permanently installed. The key-like form 23 of the locking key 5 can be inserted properly into the insertion aperture 16.

Figure 10K:
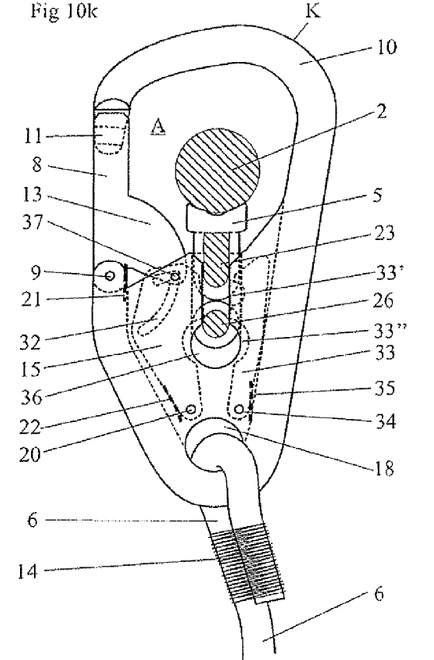

FIG. 10k shows how the locking key 5 pushes the locking lever 33 into the position that releases the unlocking key 26. This is pushed down by means of the locking key 5.

Figure 10L:
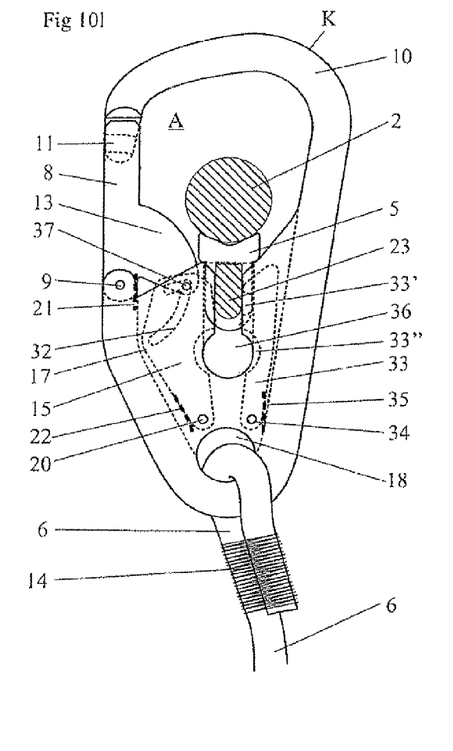

In FIG. 10l, the unlocking key 26 has already been removed. Due to the shape of the locking key 5, it can be removed through the insertion aperture 16 again.

Figure 10M:
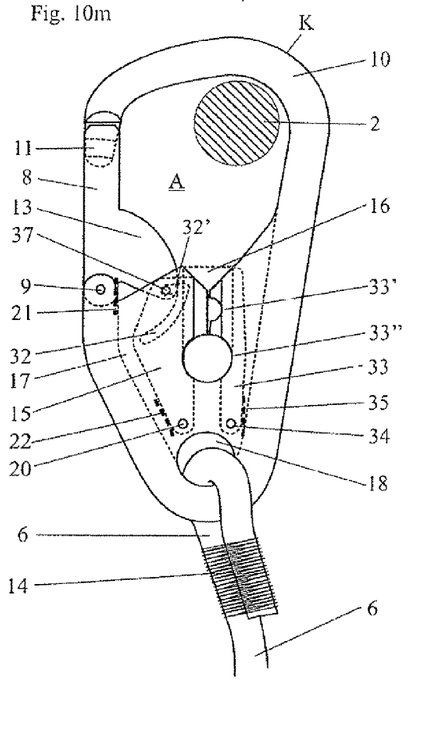

FIG. 10m shows how the blocking mechanism 15 is now pushed into this position by the leaf spring 22, which locks the gate 8 against opening. The person to be belayed is now secured via the steel cable 2.

Figures 11, 12, 13, 14:
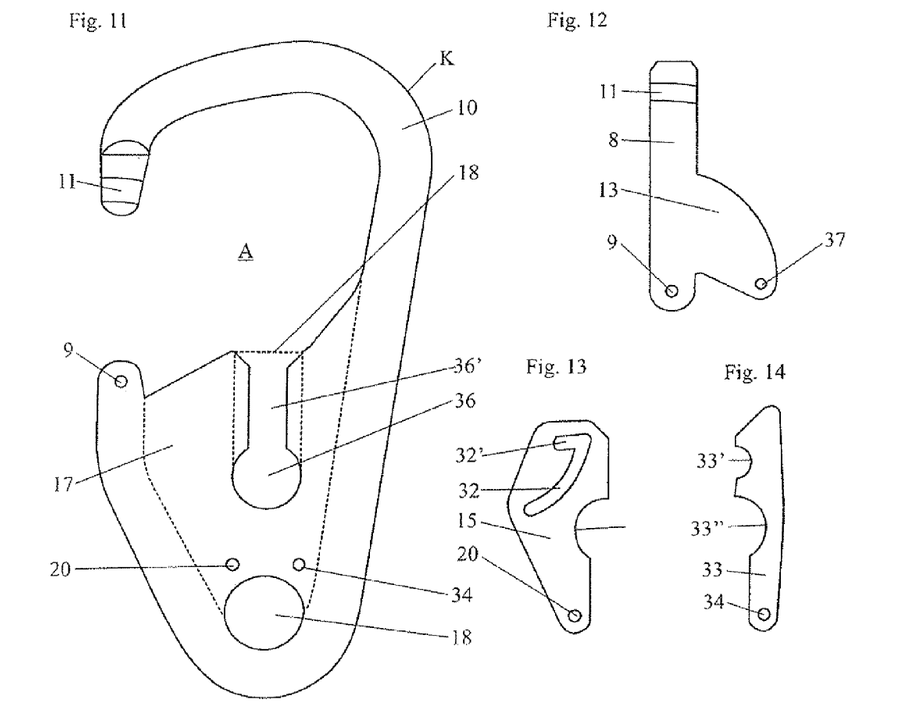

FIG. 11 shows the body 10 of this variant of the safety device which is shown in FIG. 10a to FIG. 10m. The fastening component comprises an insertion aperture 18, into which both the locking key 26 and the unlocking key can be properly inserted. 36' represents the position in which an unlocking key 26 blocks by means of the recess 33' of the engaging mechanism 33. 36 denotes the removal aperture for the unlocking key 26. The engaging mechanism 33 is mounted rotatable on an axle 34 (preferably a riveted metal pin or screw). The blocking mechanism 15 is mounted rotatable on an axle 20 (preferably a riveted metal pin or screw). The fastening component K is connected to the person to be belayed P by a connecting piece 6, which is passed through the hole 18 and is fixed by means of a knot, a crimp or a sewing.

FIG. 12 shows the gate 8 of the fastening component. 9 denotes the shaft of the gate (preferably a riveted metal pin or a screw). The recess 11 guarantees secure locking of the gate 8 on the body 10 of the fastening component K. The cantilever 13 of the gate 8 serves to block this by means of the blocking mechanism 15. For this purpose, a steel pin 37 or other projection is mounted on the cantilever 13, which is suitably positioned in the recess 32 of the blocking mechanism 15. Depending on the position of the blocking mechanism 15, this now releases the gate 8 to open or blocks it.

Figure 15:
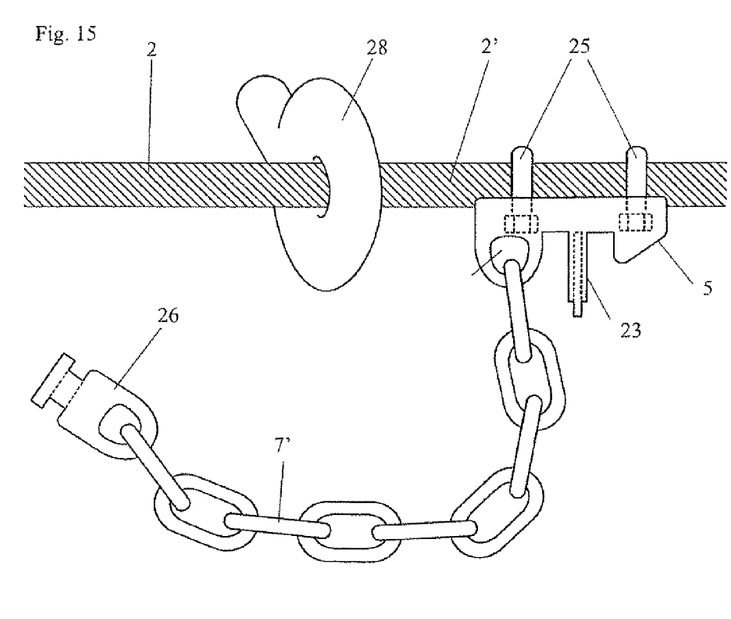

FIG. 15 shows a possible combination of the locking key 26 and the unlocking key 5. The locking key 5 is permanently attached to the outgoing steel cable 2' by means of two cable clamps 25 (so-called U-bolts). The locking key 26 is connected to the locking key 5 by means of a connecting piece 7' (shown here as a chain). The connecting piece 7' must be of sufficient length to guarantee that the unlocking key 26 can be inserted into a fastening component K led along the incoming steel cable 2.

Figure 16:
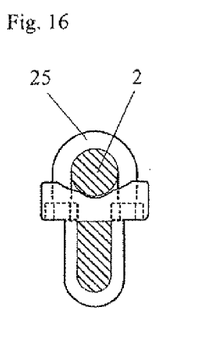

FIG. 16 shows the locking key 5. Due to its U-shaped design, the key-like form 23 is not locked into the recess 33' of the locking mechanism 33. Thereby, an unlocking key 26 can be released and subsequently the locking key 5 can be removed again through the insertion aperture 18 of the fastening component K.

Figure 17:
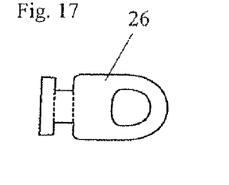

FIG. 17 shows the lateral view of an unlocking key 26.

FIG. 18a to FIG. 18h show the procedure during transfer from one unlocking key 26 to another unlocking key 26' and the subsequent transfer to a steel cable 2'.

Figure 18A:
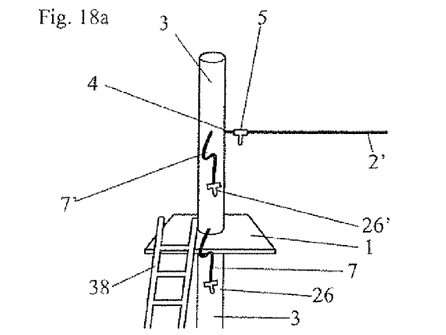

FIG. 18a shows a typical situation on a rope course. A mast 3 is shown with a platform 1. In order to reach the platform from below, the ladder 38 is used as a climbing aid. Furthermore, two unlocking keys 26 and 26' are shown, which are each connected to the mast 3 by a connecting piece 7 and 7'. The length and attachment of the connecting pieces 7 and 7' must guarantee that both unlocking keys 26 and 26' can be brought together to the extent that both can be inserted, one after another, into the insertion aperture 18 of the fastening component K. An outgoing steel cable 2' is also shown, on which a locking key 5' has been mounted.

Figure 18B:
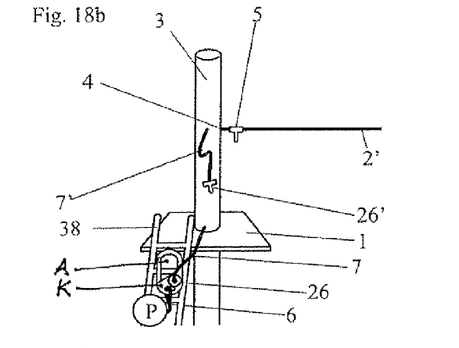

In FIG. 18b, a person to be belayed P is using the ladder 38 as a climbing aid. At this point in time, the person P is secured against falling by the unlocking key 26 and the connecting piece 7.

Figure 18C:
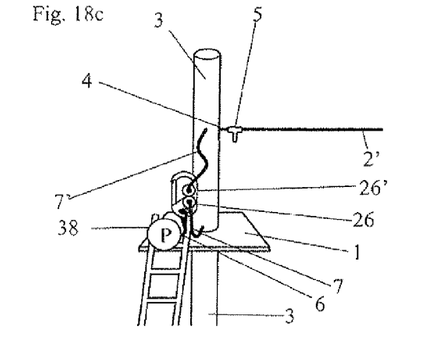

FIG. 18c shows how the second unlocking key 26 is inserted into the insertion aperture 18 of the fastening component.

Figure 18D:
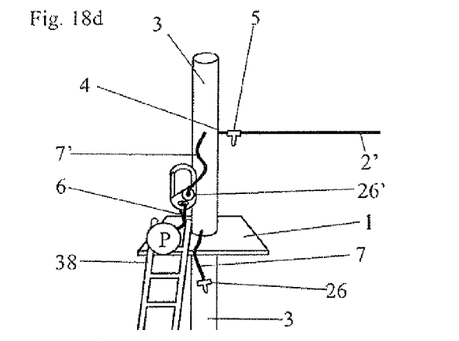

As shown in FIG. 18d, this involves the second unlocking key 26' assuming the safety function and the first unlocking key 26 disengaging from the fastening component K.

Figure 18E:
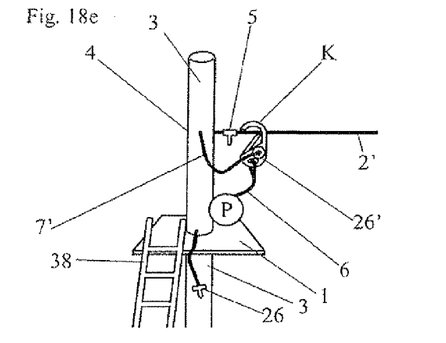

In FIG. 18e, the fastening component K, whose gate 8 can be opened due to the presence of the unlocking key 26', is attached to the steel cable 2'.

Figure 18F:
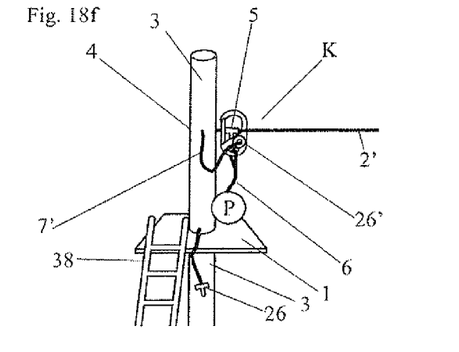
Figure 18G:
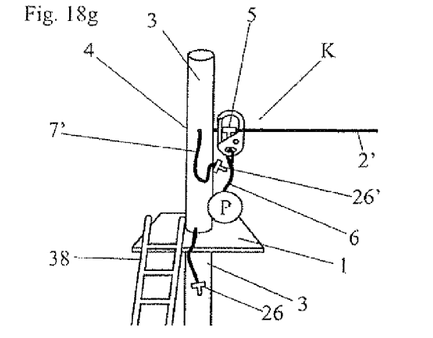

In FIG. 18f, the locking key 5 permanently attached to the steel cable 2 is inserted into the insertion aperture 18 of the fastening component. This results in the gate 8 of the fastening component K being locked against opening and the unlocking key 26' being released from the fastening component K. The person P is now secured via the steel cable 2'.

Figure 18H:
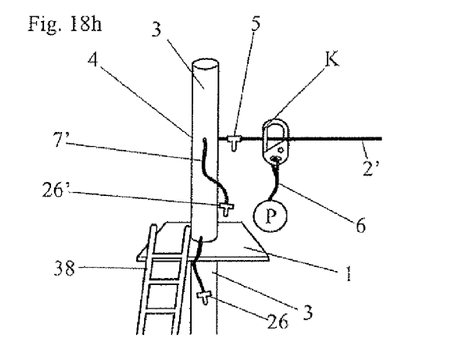

In FIG. 18h, the person P can safely continue on the next section of the rope course.

High Rope Courses

The safety device in accordance with the invention facilitates maximum participant safety on high rope courses. This enables the participant to focus fully on the exercises and less on safety.

Thereby, the problem of child safety and the safeguarding of inexperienced participants is solved, whereby the instructors are under less pressure.

Overtaking and passing in opposite directions is possible at all points with locking and unlocking keys; any number of exercises can begin or end on each platform. Furthermore, the system provides the opportunity for telemetric participant guidance on the high rope course. By varying the design of the locking key, it can be ensured that difficult exercises can be made available only to experienced participants, while easier or lower exercises can be made available both to experienced and to inexperienced participants (such as children).

Existing self-belay high rope courses can be modified for the use of the safety device in accordance with the invention with little outlay.

The fastening components are only connected to the person to be belayed by a rope or strap; bothersome components, such as coupling equipment between fastening components, are not necessary.

Vie Ferrate

For vie ferrate, the safety device in accordance with the invention provides the opportunity for larger groups, such as school groups, to enjoy climbing with relatively little supervision. The climber hooks himself on at the beginning of the climb, continues along the route to the end and can only release the safety line again there.

Overtaking and passing in opposite directions is possible at all points with locking and unlocking keys. Steel cables, as well as zip-lines, ladders or other climbing aids, can likewise be used.

Exiting and re-entering the system is also possible if, for instance, a via ferrata is not continuously equipped with steel cables and other securing means.

Existing self-belay vie ferrate can be modified for the use of end-to-end-safe via ferrata sets with little outlay.

Vie ferrate can be permanently equipped with the unlocking and locking keys in accordance with the invention. Temporary use is also conceivable whereby both keys are installed, ideally as a combination as shown in FIG. 6, by the mountain guide leading the way and are removed again after the safe passage of the group by the second mountain guide following.

Safety for Work on Buildings

External work on buildings, such as the maintenance of wind turbines, window cleaner on skyscrapers, set construction, lighting technicians, cameramen during filming or renovations are often performed without scaffolding.

The individuals doing the job are therefore secured using cables. Along with the main activity, that is, renovations, repairs or other work at height, the individuals doing the job also have to master climbing and safety techniques. Again and again, due to concentrating on the actual task or due to the pressure of time, safety is neglected and, as a result, accidents occur.

The safety device in accordance with the invention precludes inadvertently releasing while working.

Existing structures can easily be equipped with locking and unlocking keys and the system can be pre-installed in new constructions without great outlay.

Securing of Astronauts and Space Tourists

The safety device in accordance with the invention can be used not just for climbing, but also as a safeguard in totally different fields, right up to securing astronauts on the outside of a spacecraft.

Security on Boats and Ships

Securing individuals using belts and carabiners—particularly in bad weather—is standard on boats and ships. Here, too, the safety device in accordance with the invention can guarantee greater safety.

Further Possible Applications

The safety device in accordance with the invention is not only suitable for personal safety; it can also be used to secure goods. Thus, it is possible to allow the movement of a secured product only along a designated route. In open markets, for instance, all these routes can end next to the cash register.

Furthermore, the device in accordance with the invention can also prevent an escape. In this case, handcuffs could be used, for example, instead of the safety belt; individuals secured therewith would only be able to move along a route provided for the purpose.

The Problem of Operational Organisation on High Rope Courses

If several exercises for high rope courses are provided in association with one another, then there are a number of ways in which the various components can be arranged:
  Arrangement as a Circuit
  Radial Arrangement
  Random Arrangement Both instructors and participants must exercise constant care not to exceed the capacities (maximum loads) of the platforms and the exercises. A frequent problem here is the varying speed of the participants on the different exercises or the participants overtaking each other (or wanting to do so). Furthermore, participants frequently want to repeat attractive exercises.

Hence, the instructors are challenged, both organisationally and in terms of safety.

Independent Supervision by the Continuously Safeguarded Belaying Device

The participants' route can be controlled by targeted allocation of the keys for the continuously safeguarded belaying set. An exercise can only be entered on the side where a key has been installed.

By using a variety of keys, different participants can be guided through the high rope course on different routes. Thus, for example, it can be controlled that children only go for easy exercises at lower heights; good climbers are given access to all exercises with their key.

By analogy, the same is true for conventional vie ferrate that have been modified for end-to-end safeguarding by the installation of keys.

Control Using the End-to-End Safeguarded Belaying Set with Tagged Keys, Radio Transmission and Computers It is possible to associate information content with the keys 5 using chips or optical scanning (as well when using European Article Number Codes). Thus, the carabiner K1 and K2 know where it is located.

If the carabiners are now equipped with a radio system (e.g. Bluetooth), they can thereby not only communicate among one another, they can also transfer the information to a computer in this manner.

With the aid of this control system the following options can be realized, either automatically or by manual intervention by an instructor:
  suspending exercises
  suspending the entire facility (e.g. in the case of an accident)
  preventing re-entry and only allowing the route towards the exit (e.g. at closing time)
  controlling the number of participants permitted on an exercise
  controlling the direction in which exercises are undertaken
  allowing or prohibiting overtaking maneuvers
  billing for use according to time
  billing according to number and type of exercises undertaken
  investigate the overall user numbers for exercises to determine the time of the next session
  investigate the appeal of the exercises to allow for this to be considered in changes to the high rope course.

The invention is not limited to the embodiments described above; it can be modified in a variety of ways, e.g. so-called "FROGS" can be used in place of the carabiners.

Furthermore, the key can also take the following forms:

optical with laser scanning: the carabiner recognises that it is located at a secure point by laser scanning a code at a secure point (e.g. a steel cable).

computer chip: with the aid of a smart chip or non-smart chip at a secure point (e.g. steel cable), the carabiner recognises that it is located at a secure point.

inductive: the steel cable is used as the iron core of an induction process. This has the advantage of not having to attach a key and the steel cable can be used as a key. Triggering the induction process by other metallic objects (e.g. a bunch of keys, a pocket-knife) should be prevented here.

magnetic: the steel cable serves as the iron core and so will attract a magnetic blocking mechanism in its direction. This solution makes the attachment of a key on the steel cable unnecessary and is thus also suitable for unprepared vie ferrate or high rope courses.

The invention claimed is:

1. A belaying system, comprising:
a fastening component for securing a load by way of a connecting element to a securing means and forming a recess that receives the securing means;
a bar coupled to the fastening component;
an unlocking component separate from the fastening component and attached to the securing means, wherein the bar is unlocked by the unlocking component to open the recess and release the securing means from the recess; and
a locking component separate from the fastening component and separate from the unlocking component, the locking component attached to the securing means separately from the unlocking component, wherein the bar is locked by the locking component to close the recess, such that while the recess is open the unlocking component is attached to the fastening component, the unlocking component remains attached to the fastening component until released using the locking component.

2. The belaying system in accordance with claim 1, wherein the unlocking component is connected to the securing means by a flexible connecting piece configured to withstand a predetermined load heavier than a person to be belayed.

3. The belaying system in accordance with claim 1, wherein two or more fastening components are provided, each fastening component comprising a respective recess for the admission of the securing means, closable by movement of respective bars, each bar unlockable by an unlocking component and lockable by a locking component.

4. The belaying system in accordance with claim 1, wherein the fastening component, when attached to the unlocking component, is attachable to another unlocking component and this other unlocking component is attachable to the fastening component while the first unlocking component is released.

5. The belaying system in accordance with claim 1, wherein the locking component and the unlocking component are arranged on an assembly mounted on the securing means.

6. The belaying system in accordance with claim 2, wherein the flexible connecting piece is equipped with a damper component.

7. The belaying system in accordance with claim 5, wherein the assembly is secured by a clamp.

8. The belaying system in accordance with claim 2, wherein the flexible connecting piece is threaded through a fixed loop, is kept at a manipulation height and is counterbalanced by means of a weight.

* * * * *